United States Patent [19]

McCord

[11] 4,449,786

[45] May 22, 1984

[54] REARVIEW MIRROR

[76] Inventor: Robert C. McCord, 6220 Burton, Romulus, Mich. 48174

[21] Appl. No.: 257,490

[22] Filed: Apr. 24, 1981

Related U.S. Application Data

[63] Continuation-in-part of Ser. No. 916,598, Jun. 19, 1978, Pat. No. 4,264,144.

[51] Int. Cl.³ .............................................. G02B 5/10
[52] U.S. Cl. ................................................. 350/293
[58] Field of Search .............. 350/303, 293; D12/187; D28/65

[56] References Cited

U.S. PATENT DOCUMENTS

| | | | |
|---|---|---|---|
| 1,784,710 | 12/1930 | Showalter | 350/293 |
| 2,857,810 | 10/1958 | Troendle | 350/293 |
| 3,003,396 | 10/1961 | Jenkins | 350/293 |
| 4,258,979 | 3/1981 | Mahin | 350/293 |

FOREIGN PATENT DOCUMENTS

| | | | |
|---|---|---|---|
| 653831 | 1/1965 | Belgium | 350/293 |
| 1804610 | 10/1959 | Fed. Rep. of Germany | 350/293 |
| 1921076 | 11/1970 | Fed. Rep. of Germany | 350/293 |
| 1939756 | 2/1971 | Fed. Rep. of Germany | 350/293 |
| 1941895 | 3/1971 | Fed. Rep. of Germany | 350/303 |
| 1947956 | 4/1971 | Fed. Rep. of Germany | 350/293 |
| 2054396 | 5/1972 | Fed. Rep. of Germany | 350/303 |
| 2725952 | 12/1978 | Fed. Rep. of Germany | 350/293 |
| 1420532 | 11/1965 | France | 350/293 |
| 1461420 | 11/1966 | France | 350/293 |
| 2420452 | 10/1979 | France | 350/293 |
| 55-51635 | 4/1980 | Japan | 350/293 |
| 790069 | 2/1958 | United Kingdom | 350/293 |
| 1279158 | 6/1972 | United Kingdom | 350/293 |

*Primary Examiner*—Jon W. Henry

[57] ABSTRACT

Rearview mirrors are disclosed having a convex curvature defined by mathematical and geometrical relationships between the position of the observer, the viewed objects, and the mirror. The mathematical relationships are designed to minimize bi-ocular distortions while producing the desired field of view.

33 Claims, 15 Drawing Figures

MOLD
AXIS OF
ROTATION

SEGMENT OF NON-CIRCULAR TORUS SECTION

FIGURE 14

2ND SURFACE
1ST SURFACE
98
98
98A

REARVIEW MIRROR

CROSS REFERENCE TO RELATED APPLICATION

This application is a continuation-in-part of my application Ser. No. 916,598 filed June 19, 1978 now U.S. Pat. No. 4,264,144.

BACKGROUND OF THE INVENTION

This invention relates to rearview mirrors of the type employed by automotive vehicles, and more specifically to a family of mirrors formed in accordance with certain structural, geometrical and mathematical relationships to provide a wide field of view of objects in the rear and along side of the vehicle by providing a controlled distortion of the viewed objects, and minimizing the effects of bi-ocular vision of the image of an object in a mirror having a compound curve of variable radius.

Many rearview mirrors in automotive vehicles, as well as the side mirrors, provide a compromise between several conflicting factors. To obtain a relatively large and accurate image of other vehicles moving in the rear, as well as along both sides of the observer's vehicle obviously calls for a relatively large mirror, the larger the mirror, the better the field of view. However, large mirrors interfere with the observer's forward vision through the windshield, as well as oblique vision beyond side view mirrors.

Another problem is that a flat mirror provides only a limited view of vehicles along side the observer's vehicle. One answer is to provide a compound convex mirror having a relatively flat primary viewing surface for viewing objects to the rear of the vehicle, and increasingly curved mirror ends for extending the observer's view of side objects. This approach, however, presents several problems. Since the mirror ends are convex, there usually is considerable image distortion depending upon the curvature of the mirror, and other geometric considerations. Some of the distortion has been reduced in the prior art, but by sacrificing image size, for example U.S. Pat. No. 4,012,125 issued to Philip J. Hart. Other approaches have utilized various conic sections curves and other empirically derived curves in attempts to make an acceptable transition between the primary and edge viewing surfaces. Without exception, results are mirrors having optical distortions because of the observer's bi-ocular vision. In most cases, extremely severe bi-ocular distortions are instantaneously generated at the transition line between different geometric curvatures of the mirror. These basic problems occur in some mirrors having a compound curvature when one eye of the observer is viewing an object through one curvature, and his other eye is viewing the same object through a portion of the mirror having a different curvature. This bi-ocular problem becomes aggravated when the observer is viewing a moving object having an image progressively passing through several curvatures.

My co-pending application, Ser. No. 916,598, utilizing a continuous function modified cycloidal geometry, provides a solution for this type of mirror in which the mirror has a relatively flat primary central viewing surface for viewing objects to the rear of the observer, and a peripheral curved end portion having a curvature continuously decreasing from the primary mirror portion surface. Such a mirror, with properly selected and proportioned geometric curvature sections, provides a useful balance between a unit image or zero distortion image and a wide field of vision.

SUMMARY OF THE INVENTION

The broad purpose of the present invention is to provide an improved mirror having a controlled image distortion and a wide field of view while minimizing the distortions caused by the bi-ocular vision of the observer in accordance with defined structural, geometrical and mathematical relationships between the position of the observer, the position of the mirror, the position of the viewed objects, and the field of view. The preferred embodiment of the invention employs a mirror that may or may not have a continuously decreasing radius of curvature from the central or primary viewing portion of the mirror toward the mirror ends. Preferably the primary viewing surface is relatively flat, being either a large spherical radius or a truly non-distorting geometry. On full rearview mirrors, the opposite ends of the mirror are curved downward to provide additional surface area for viewing objects along either side of the vehicle. Side mounted mirrors employ primary and peripheral viewing surfaces, the primary surface being nearest the observer.

The preferred mirror has a transition between the primary viewing surface and the end curved peripheral surface in which the instantaneous radius of curvature of the primary surface is tangent to the curvature of the peripheral area. In addition, the instantaneous radius of curvature of the two areas at the transition point may be made substantially equal to one another to minimize any distortions caused by the observer's bi-ocular vision, and to generate a smooth image size change through said transition point.

Still other objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENTS

Figure 1:
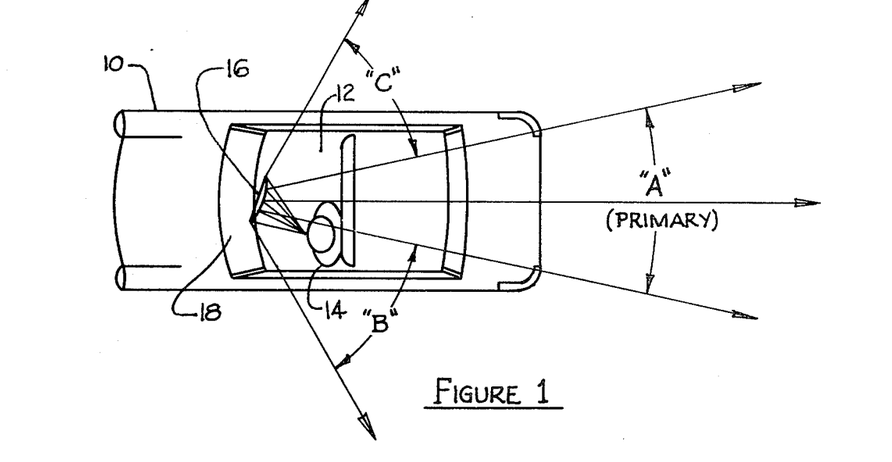
FIG. 1 is a schematic plan view of an observer in an automotive vehicle illustrating the field of view of a rearview mirror representing the preferred embodiment of the invention.

Referring to the drawings, FIG. 1 illustrates a vehicle 10 having a passenger compartment 12 and an observer 14 disposed in the driver's seat. A rearview mirror 16 is mounted in the conventional position adjacent windshield 18 of the vehicle.

Figure 2:
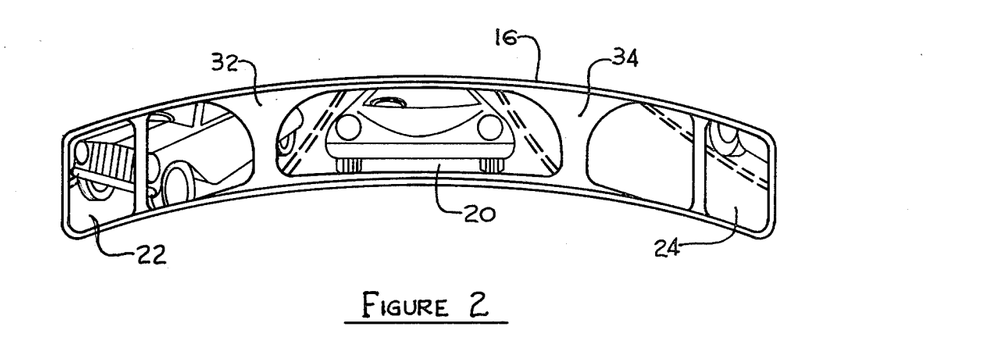
FIG. 2 is a view illustrating typical images observed in the preferred mirror.
Figure 3:
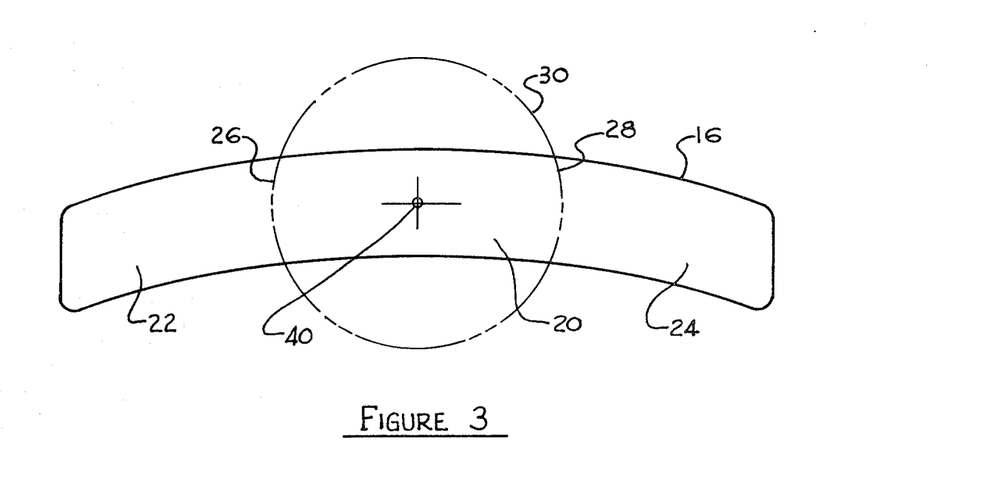
FIG. 3 is an illustration of the reflective surfaces of the preferred mirror.

Referring to FIGS. 2 and 3, mirror 16 has a primary central viewing surface 20, a left peripheral area 22, and a right peripheral area 24. The left peripheral area is connected by a transition line 26 to the primary viewing surface. The right periphery area is connected by a transition line 28 to the primary viewing surface. Lines 26 and 28 are circular arcs of an imaginary circle 30.

Mirror 16 is elongated with a somewhat bananna shape with the two peripheral areas extending lower than the primary viewing surface. The advantage of such a shape is illustrated in FIGS. 1 and 2 which show that the objects viewed directly to the rear, in the sector illustrated in FIG. 1 at "A", are somewhat higher than those objects in the adjacent lanes, viewed in opposite ends of the mirror. Further, transition lines 26 and 28, coincide approximately with rear posts 32 and 34 of the vehicle. The observer observes the image of the objects viewed through the left side windows of the vehicle in the sector of the mirror illustrated at "B", and the image of those objects viewed through the right side windows in sector "C". Sector "B" gives the field of view through the left peripheral area of the mirror, and sector "C" gives a field of view for the right peripheral area of the mirror.

The bottom of the mirror, as viewed in FIGS. 2 and 3, is curved to reduce interference with the observer's forward vision, while eliminating a portion of the mirror that would only view backseat structure. The vertical height of the mirror's primary viewing surface is chosen to accomodate the vertical height of the image of the rearview window, any further height being unnecessary for viewing objects rearward of the vehicle.

Figure 4:
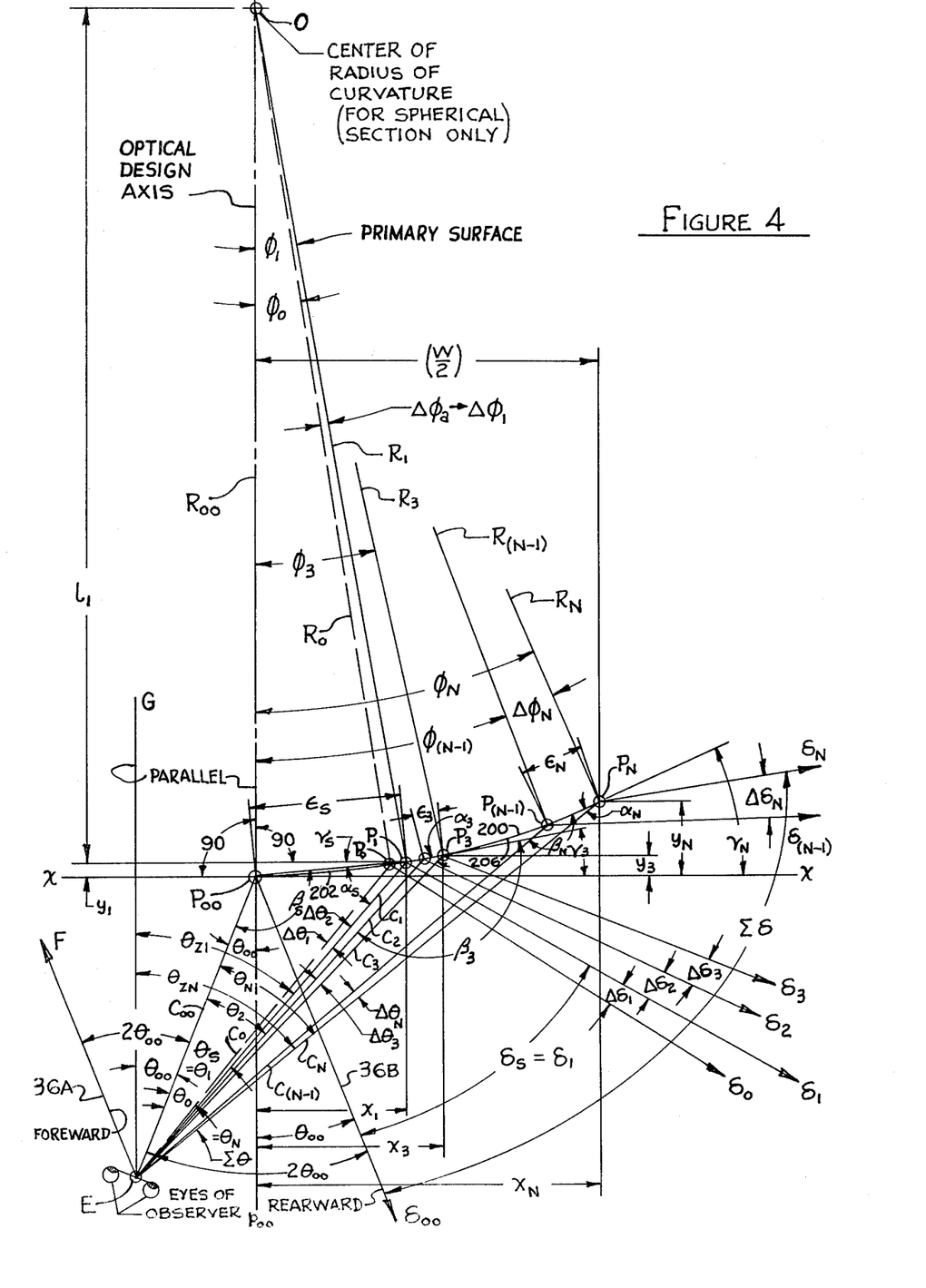
FIG. 4 is a diagram illustrating the basic geometric relationships between the observer, the mirror, the direction of observation and reflection, and the field of view developed by the mirror relative to the observer.

The basic geometry necessary to develop any of the mirrors herein described is shown in FIG. 4. A definition of symbols and structure is now put forth, being followed by a typical design example.

The convex curve ($P_{00}$, $P_N$) is an approximation of the right half of the surface of mirror 200. $P_{00}$, $P_0$, $P_1$, $P_2$, $P_3$, $P_n$, $P_{(N-1)}$, and $P_N$ are points on the mirror's surface. Line $R_{00} \equiv (0, P_{00})$ is the instantaneous radius of curvature at point $P_{00}$, and is a measure of the spherical radius of the primary viewing surface 202 of the mirror, which extends from point $P_{00}$ to point $P_1$. The transition between the primary viewing surface and the peripheral viewing surface 206 occurs at point $P_1$. The focal center, design center, and manufacturing center of the mirror, is $P_{00}$. $R_{00}$ is the axis of rotation of the mirror geometry.

The mirror surface is defined by a set of planar coordinates $(x_n, y_n)$. The line $(x—X)$ is the "x" axis, and is perpendicular to $R_{00}$ at $P_{00}$. The "y" axis is coincident with $R_{00}$. $(W/2)$ is the right half width of the mirror.

$(P_{00}, p_{00})$ is an extension of $R_{00}$, from which "x" values are measured to the right. "y" values are measured from the "x" axis toward point "0" and parallel to $R_{00}$.

$R_1$ is the instantaneous radius of curvature at point $P_1$, and is equal to $R_{00}$ since said spherical radius is inclusive of these two points.

Point E is midway between the eyes of an observer, and is the design point of observation. Line $36A \equiv (E, F)$, and is the line of direct forward sight. Line $36B \equiv (P_{00}, \delta_{00})$ is the reflected line of direct rearward sight, toward an object (not shown), as viewed by the observer from point E and reflected from the mirror's surface at point $P_{00}$. Lines 36A and 36B are parallel to each other. Point $P_{00}$ is hereby constructed as the focal center of the mirror.

For reflected light, the angle of incidence ($\delta_{00}$, $P_{00}$, $p_{00}$) is equal to the angle of reflection ($p_{00}$, $P_{00}$, E), as measured from line ($P_{00}$, $p_{00}$)I which by construction is perpendicular to the instantaneous radius of curvature of the mirror at point $P_{00}$. Said angles are designated as $\theta_{00}$. Therefore, angle $(\delta_{00}, P_{00}, E) = 2\theta_{00}$, by addition. By further geometric principles, angle $(P_{00}, E, F) = 2\theta_{00}$, as well. Line (E, G) is now drawn parallel to line $(p_{00}, P_{00}, 0)$ and, for identical geometric reasons, angle $(G, E, P_{00}) =$ angle $(E, P_{00}, p_{00}) = \theta_{00}$. The foregoing facts establish the geometric relationships between the vehicle's attitude and the design geometry of the mirror.

Angle $(P_{00}, E, P_1) = (\theta_{z1} - \theta_{00}) = \theta_s = \theta_1$, is the vision angle across the spherical primary viewing surface of the mirror. A series of equal $\Delta\theta$ increments are generated for the purpose of establishing uniform vision angle elements. Therefore, by definition, $\Delta\theta_1 = \Delta\theta_2 = \Delta\theta_3 = \Delta\theta_n = \Delta\theta_N$ are all equal vision angle differential increments. These equal $\Delta\theta$ vision angle increments subtend arc/chords $(P_0, P_1)$, $(P_1, P_2)$, $(P_2, P_3)$, $(P_{(n-1)}, P_n)$, and $(P_{(N-1)}, P_N)$, respectively, along the mirrors convex curve $(P_{00}, P_N)$, which are normally not equal. Angle $\Sigma\theta - \theta_1$ is the total vision angle across the right half of the mirror, and is: $\Sigma\theta = (\theta_{zN} - \theta_{00}) = \theta_n$.

Subscripts symbols are defined as follows: All numeral values are specific points of interest. The letter (N) defines the final point at the right peripheral edge of the mirror. The letter (n) defines any random point of interest along the mirror's curvature.

$\beta_n$ and $\alpha_n$ are internal obtuse and acute angles, respectively, of respective oblique triangles of interest. $\epsilon_n$ values are the short side of said respective triangles, and are chordal segments along the mirror's curvature. All symbols with "s" subscripts in FIG. 4 refer to spherical sections of the mirror. Typically, $\beta_{\Sigma 1}, \alpha_{\Sigma 1}$, and $\epsilon_{\Sigma 1}$ are elements of triangles $(P_{00}, E, P_1)$. Similarly, $\beta_1$, $\alpha_1$, and $\epsilon_1$ are elements of triangles $(P_0, E, P_1)$; and $\beta_n$, $\alpha_n$, and $\epsilon_n$ are elements of triangle $(P_{(n-1)}, E, P_n)$; and $\beta_N$, $\alpha_N$, and $\epsilon_N$ are elements of triangle $(P_{(N-1)}, E, P_N)$. $C_{00}$, $C_0$, $C_1$, $C_2$, $C_3$, $C_n$, $C_{(N-1)}$, and $C_N$ are typical vision ray lengths from the observer at point E to their respective points on the mirror's surface. Typically, $C_2 \equiv (E, P_2)$ $R_n$ values are radii of curvature at respective points $P_n$. For the spherical primary surface only, the origin of all $R_n$ value is at point "0". At all other random points of interest $P_n$, the origin of the respective $R_n$ values does not lie at point "0" nor at any other point of defined interest. The origins of said instantaneous radii of curvature are of no interest, only the $\phi_n$ angles and their $\Delta\phi_n$ increments are of interest. By definition, $\phi_n$ is constructed perpendicular to a tangent line drawn to the instantaneous radius of curvature of the mirror at point $P_n$. $\phi_n$ is the angular displacement of $R_n$ from the axis of rotation of the mirror $R_{00}$. Also, because perpendicular lines form equal angles with respective elements of other perpendicular lines, $\phi_n$ is also a measure of the slope angle of instantaneous tangents to the mirror's curvature through point $P_n$, with respect to the (x—x) axis, which slope controls the angle of reflection of light rays incident thereupon; those reaching the observer at point E being of principle interest in this invention. $\Delta\phi_n$ is the differential increment between $\phi_{(n-1)}$ and $\phi_n$.

$\gamma_n$, not to be confused with $\phi_n$, is a measure of the instantaneous slope angle of the chord $\epsilon_n = (P_{(n-1)}, P_n)$, with respect to the (x—x) axis.

Finally, all $\delta$ and $\Delta\delta$ values are representations and/or measurements of field angle components, which this invention compares to respective constant $\Delta\theta$ values according to well defined mathematical relationships of said invention. The $\Delta\theta$ increments are always taken equal to each other, while the $\Delta\delta$ increments are usually continuously increasing in value based upon said formula(s). The basic relationships between $\theta$ and $\delta$ are:

$\Delta\delta_n = (\Delta\theta + 2\Delta\phi_n)$, is the incremental angular relationship;

$\delta_N = (\theta_N + 2\phi_N) = [\theta_N + 2\gamma_N + (\Delta\gamma_N/2)]$, is the field angle relationship.

$\delta_N = (\delta_0 + \Delta\delta_1 + \Delta\delta_2 + \Delta\delta_3 + \ldots + \Delta\delta_N)$, is another field angle relationship.

Figure 5:
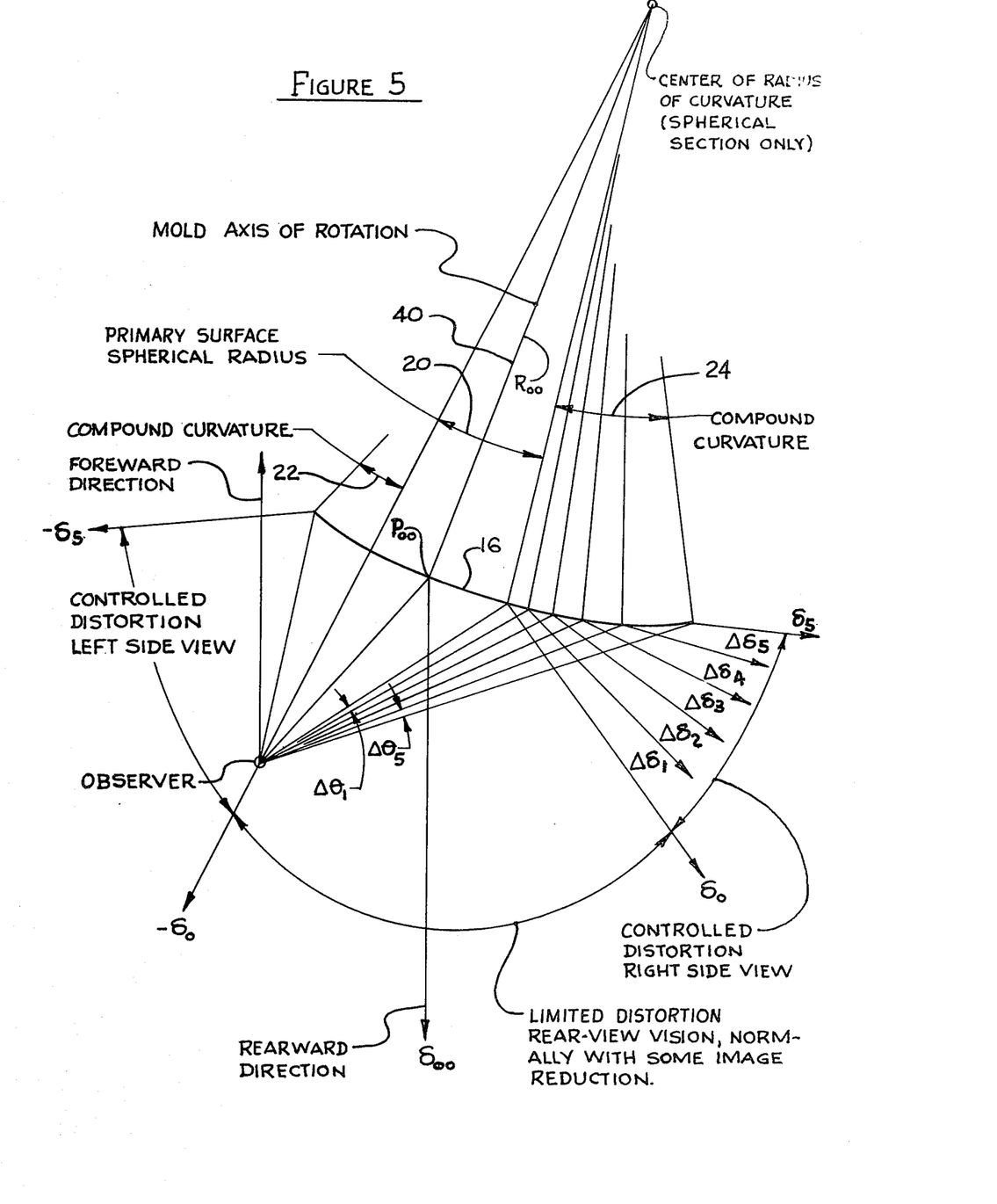
FIG. 5 is a diagram illustrating the geometric relationships defining the curvature of the mirror.

The composition of the preferred embodiment is shown in FIG. 5, and is applicable to both full-rearview and side-view types. For full-rearview types, three distinct viewing areas are distinguished: primary viewing area 20, left peripheral viewing area 22, and right peripheral viewing area 24. For side view types, either the left viewing area 22 or the right viewing area 24 is eliminated for right-side or left-side mirrors, respectively.

The primary viewing area consists of a relatively large spherical radius producing little image size reduction. The intent is to limit image reduction. The peripheral areas and curvature interfaces conform to certain mathematical and geometric relationships herein disclosed.

The geometry of the preferred embodiment is defined by the following mathematical relationships which apply to the curvature of the right and left peripheral viewing areas for generating a constant rate of optical distortion from the primary viewing area to the end of the mirror.

The basic principal of all of the following formulas, (1) through (6), is that the ever changing field angle differentials ($\Delta\delta_n$) are always derived in relationship to constant vision angle differentials ($\Delta\theta_1 = \Delta\theta_2 = \Delta\theta_n \ldots = \Delta\theta_N$).

$$\Delta\delta_n = \{\Delta\delta_{(n-1)}\}\{1+X\} \qquad \text{FORMULA (1)}$$

when $(1+X) = (Y)$ then:

$$\Delta\delta_n = \{\Delta\delta_{(n-1)}\}(Y) \qquad \text{FORMULA (2)}$$

Formula (2) is the general formula for a "constant rate" of optical distortion for these mirror applications.

This expression states that "Y" is the constant multiplying factor which develops a constant rate of change for the $\Delta\delta_n$ value with respect to each respective field angle increment ($\Delta\delta_{(n-1)}$) for the field of view ($\delta$), relative to a constantly and uniformly changing field of vision $\theta$.

Figure 6:
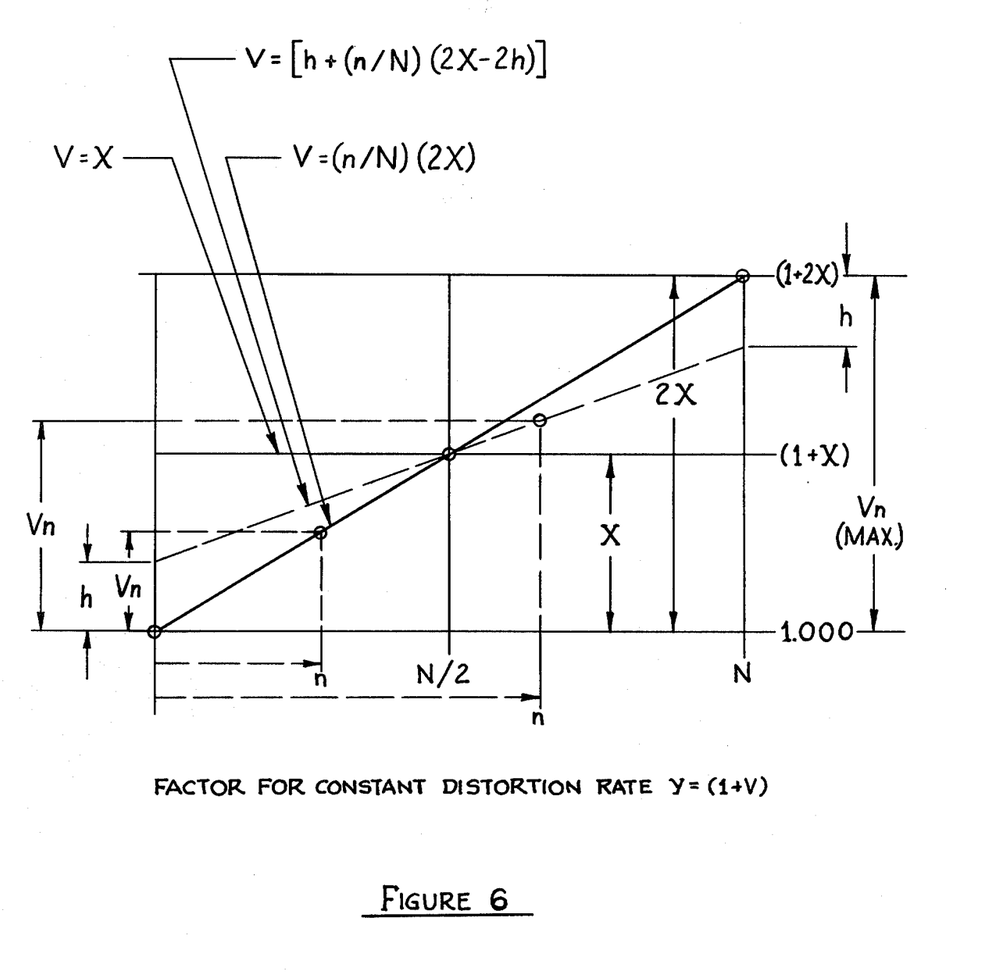
FIG. 6 is a chart which illustrates typical modifying factors. Embodiment 1 exclusively employs $V=X$ and $Y=(1+V)$. Embodiment 2 exclusively employs $V=(n/N)(2X)$ and $Y=(1+V)$. Embodiment 3 employs $V=[h+(n/N)(2X-2h)]$ and $Y=(1+V)$.

"X" is a constant value and is chosen by trial and error until all physical conditions for a particular application, including total field angle ($\Sigma\delta$) = $S_n$ are satisfied. In FIG. 6, the horizontal line $Y = (1+X)$ illustrates this constant multiplying factor.

A second preferred mathematical relationship for defining the curvature of the periphery areas generates a constantly changing rate of optical distortion and is illustrated in the following formula:

$$\Delta\delta_n = \{\Delta\delta_{(n-1)}\}\{(1+X) - X + (n/N)(2X)\} \qquad \text{FORMULA (3)}$$

combining:

$$\Delta\delta_n = \{\Delta\delta_{(n-1)}\}\{1 + (n/N)(2X)\} \qquad \text{FORMULA (4)}$$

when $(n/N)(2X) = (V)$ then:

$$\Delta\delta_n = \{\Delta\delta_{(n-1)}\}\{1+V\} \qquad \text{FORMULA (5)}$$

The "X" value of this expression is defined the same as that in Formulae 1 and 2 and is derived in the same manner. In this formula, the (n/N) (2X) factor defines and produces a constantly changing rate of change for the $\Delta\delta_n$ value with respect to each respective field angle increment ($\Delta\delta_{(n-1)}$), thus controlling the optical distortion factor, and is illustrated in FIG. 6 as the diagonal straight line function $V = \{(n/N)\cdot(2X)\}$.

Referring again to FIG. 6, a multiplying factor may be generated to vary between those used in formula (1) and in formula (4), as follows:

$$\Delta\delta_n = (\Delta\delta_{(n-1)})\{1 + [h + (n/N)(2X - 2h)]\} \qquad \text{FORMULA (6)}$$

Because the formula are based upon the relationship of the observer's eyes to the mirror, the right and left peripheral viewing areas are not symmetrical.

With further reference to FIG. 5, the basic curvature of the left and right hand viewing areas is revolved about an axis 40 passing through the geometric center of the mirror. The result is a compound curvature having a relatively flat midsection, and left and right peripheral viewing areas each having a unique compound convex curvature, usually with a decreasing radius of curvature, from the primary viewing area to the ends of the mirror.

Figure 13:
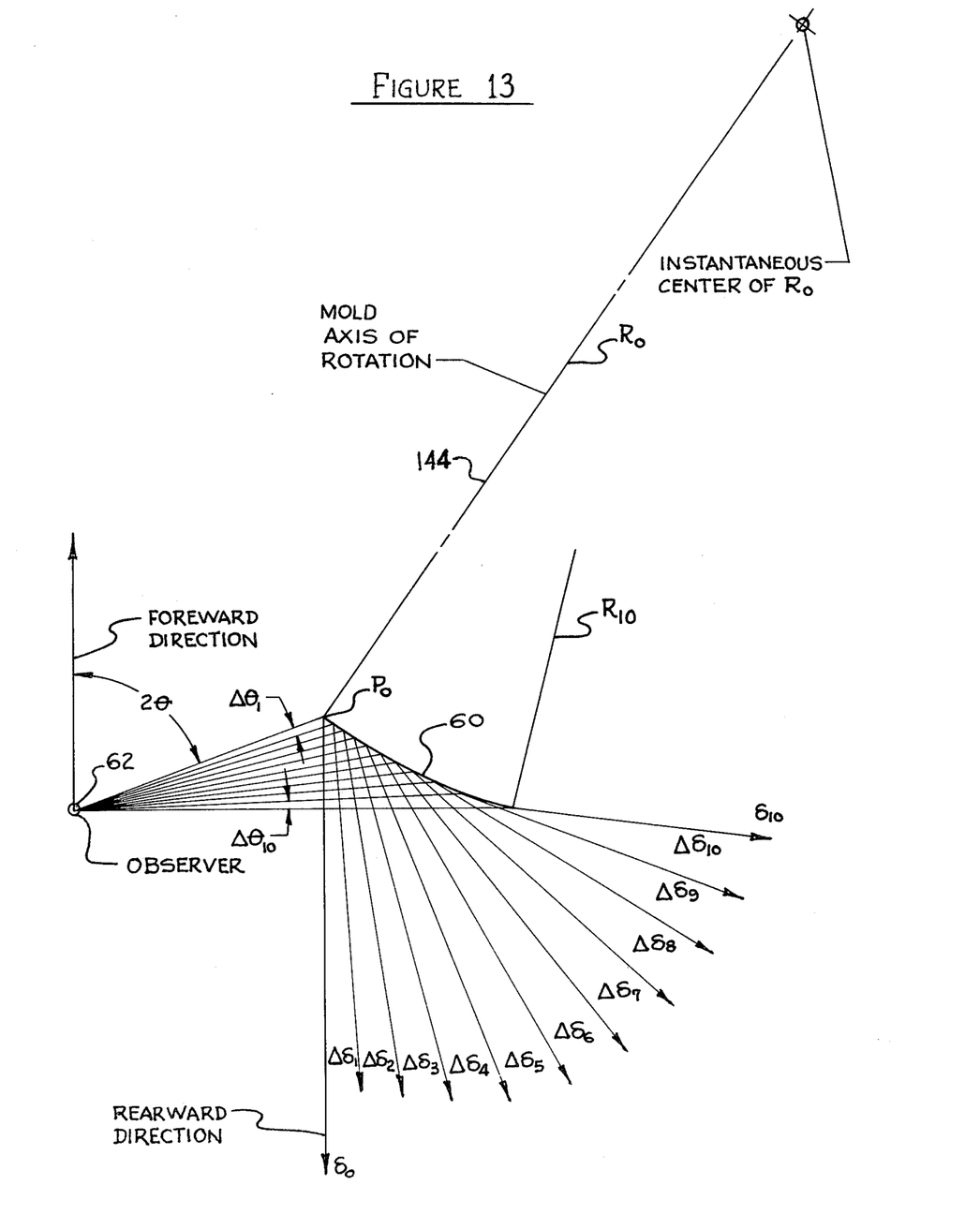

FIG. 13 illustrates a mirror 50 having the same peripheral border as mirror 16, but in which the surface of the peripheral ends are developed independently along a plurality of radial lines 50A, 50B, 50C, etc., which extend completely around the axis of the mirror in equal-spaced angular relationship, being generated per either Formula (1), (2) or (6). The surface of the mirror is smoothly generated from each radial line to its neighboring radial lines. This differs from mirror 16 in which a single curvature is developed for one end of the mirror which is then revolved around the focal axis to generate the surface of that mirror end and a second curvature is developed for the opposite end, which is then also revolved around the focal axis to develop the opposite peripheral viewing surface.

Figure 8:
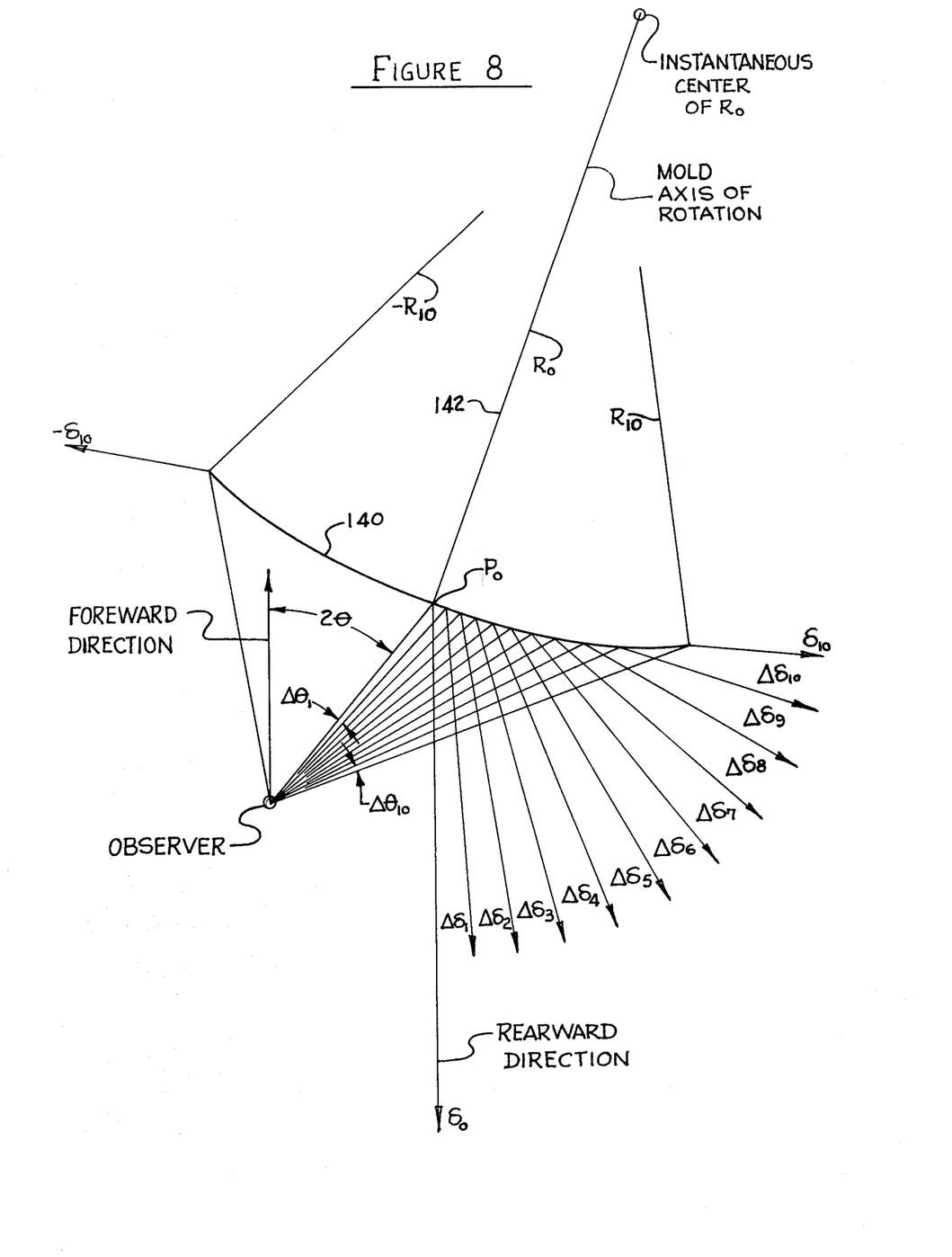
FIG. 8 is another diagram illustrating the geometric relationship of the curvature of another embodiment of the invention.
Figure 9:
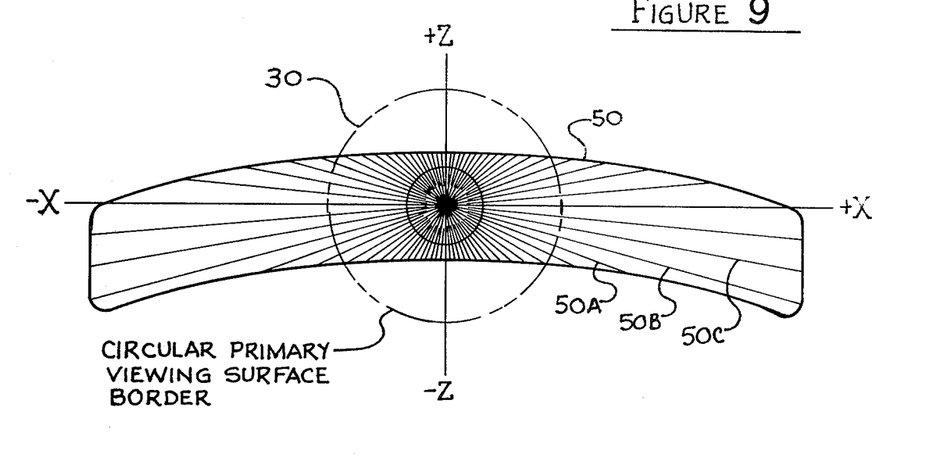
FIG. 9 illustrates another embodiment of the invention.

FIG. 8 illustrates another mirror 140 embodying the invention in which there is no primary or central viewing area, the left and right periphery areas being joined along the center of the mirror 140. The mirror is symmetrical about the line of joinder. The curvature of the right peripheral viewing area is defined according to Formula (1), the curvature of the left peripheral viewing area is also defined according to Formula (1), and then the values of corresponding points on opposite sides of the central axis are averaged to define a final curve that is revolved about the axis of rotation. This type of mirror having an averaged peripheral area can also be made with a central viewing area.

FIG. 13 illustrates a peripheral curvature developed in which none of the $\Delta\delta$ components are equal. This mirror is an outside mirror having a curvature 60. The eye of the observer is located at 62.

Figure 10:
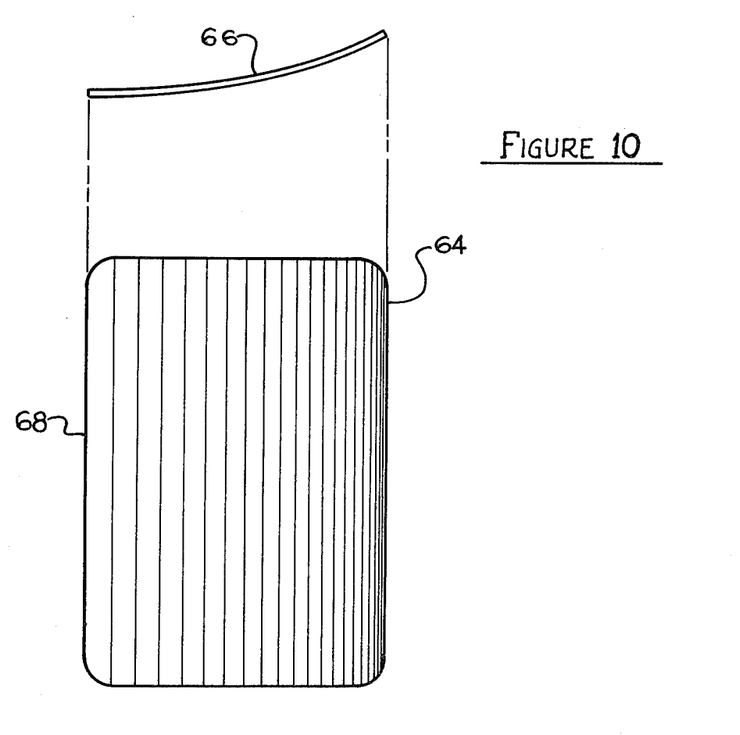
FIGS. 10–13 show various outside mirrors and geometries illustrating curvatures derived from the preferred formulae.

FIG. 10 shows a mirror 64 in which the generated curve is not revolved about a central axis, but has a curvature 66 extended along a linear border 68.

It is to be understood that the inventive mirror may be molded from a prismatic glass blank, thus giving the vehicle observer the option of a silvered second surface providing maximum light reflection for normal daylight driving conditions, or a plain first surface providing minimum light reflection for a night driving condition. See FIG. 14.

In addition, anti-glare type glass or glass treatments may be applied to any of the mirrors disclosed herein, such as a tinted mirror.

Figure 11:
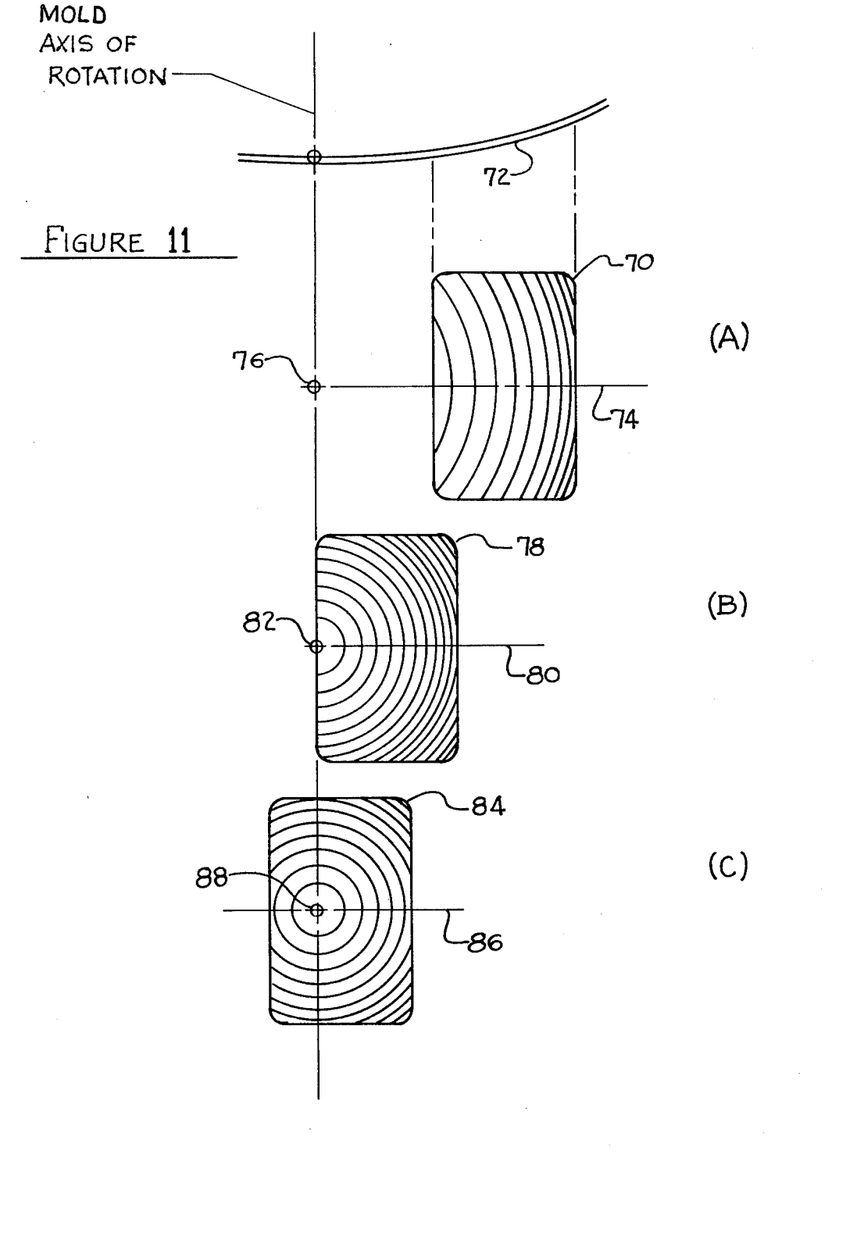

Mirrors developed in accordance with the preferred formula are illustrated in FIGS. 11A, 11B, and 11C. FIG. 11A shows a mirror 70 generated with a curvature 72 along line 74 that is revolved about an axis 76 to develop the reflective surface. Axis 76 is displaced from the edge of the mirror.

FIG. 11B illustrates a mirror 78 developed by generating a curvature along line 80 which is then revolved about an axis 82 that extends through the edge of the mirror.

FIG. 11C illustrates a mirror 84 developed by generating a curvature along line 86 which is then revolved about an axis 88 which extends through the surface of the mirror.

Figure 12:
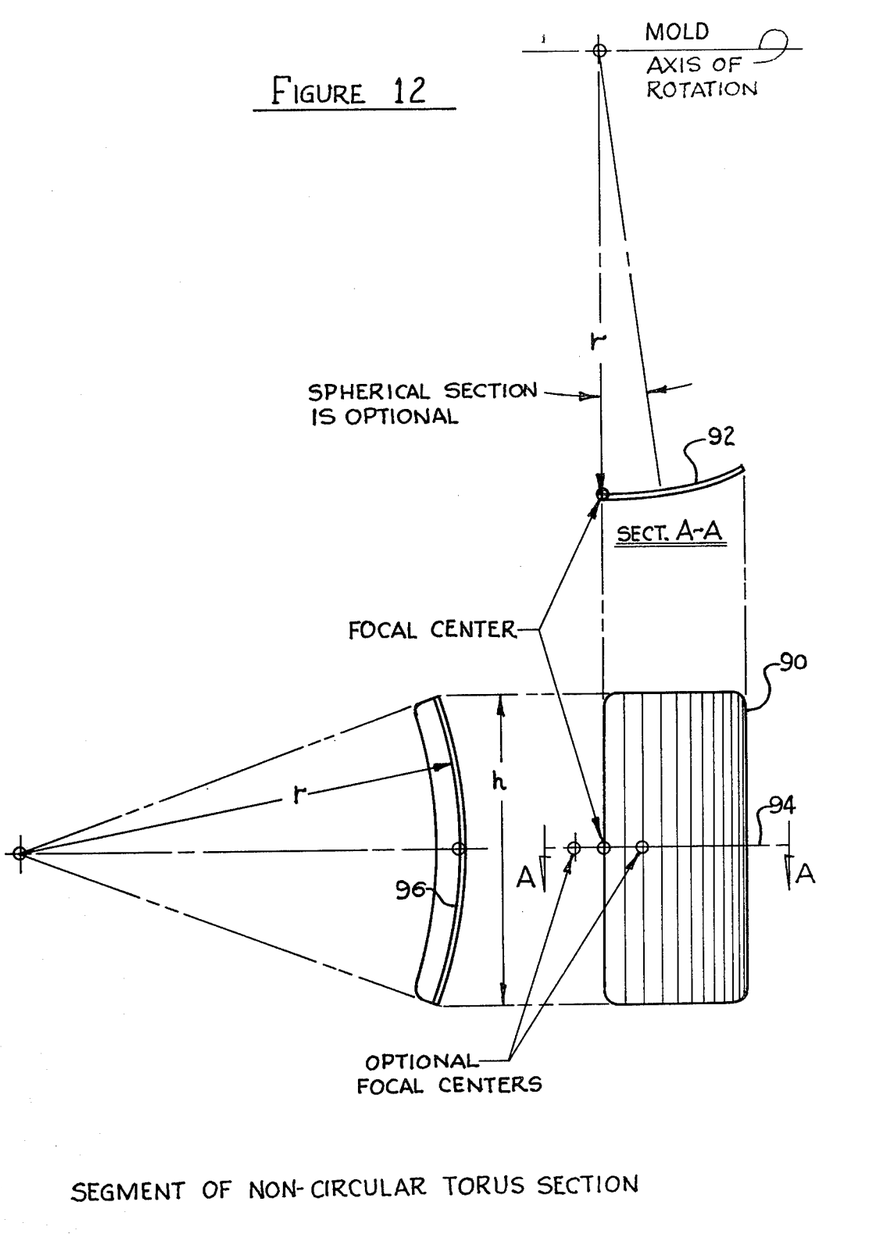

FIG. 12 shows a method for developing a mirror 90 having a curvature 92 developed along line 94. Curvature 92 shows the cross section of the mirror as seen along section line A—A. This mirror has a second curvature along its Y axis, as illustrated at 96. In this case, the reflective surface of the mirror has a decreasing radius of curvature and forms a segment of a non-circular torus section. Radius r is determined by the height "h" of the mirror and by the required total vertical field-of-view of the mirror. This geometric concept is particularly applicable to an eighteen-wheeler commercial trailer and some commercial bus type vehicles, where the mirror is mounted very high above the road surface, which demands a substantially increased vertical field of view. The horizontal curvature selected is rotated about a different horizontal axis, which is displaced from the primary curvature by the dimension of radius "r".

Optional locations of the focal center with respect to the horizontal curvature shown in FIG. 12, agree with the concept shown in FIGS. 11A, 11B, and 11C. A plane, which is tangent to the horizontal curvature at its focal center, is parallel to the axis of rotation and is normal to a radius line therefrom.

Figure 14:
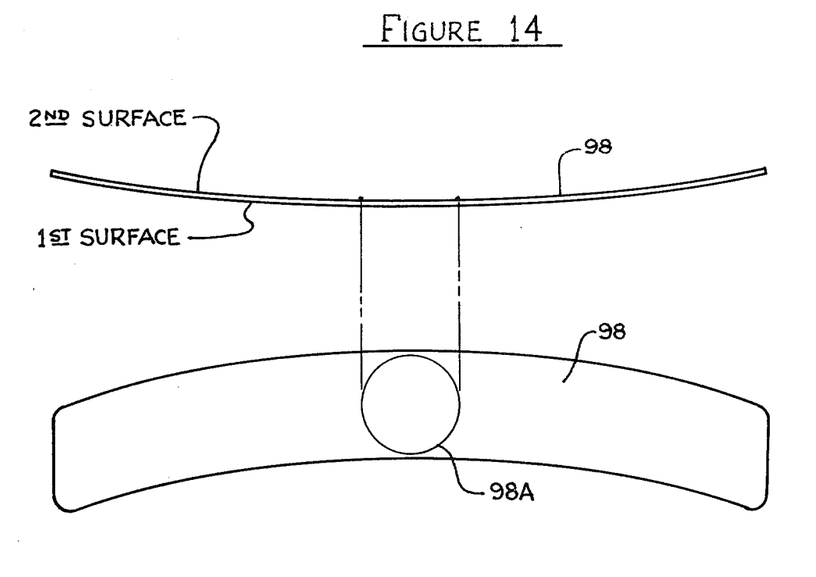
FIG. 14 shows a mirror having a bull's eye ring to aid viewing adjustments.

FIG. 14 shows a preferred rearview mirror 98 having a thin bull's eye ring 98A affixed preferably to the rear surface of the mirror prior to silvering. Ring 98A aids the user in adjusting the mirror.

Figure 15:
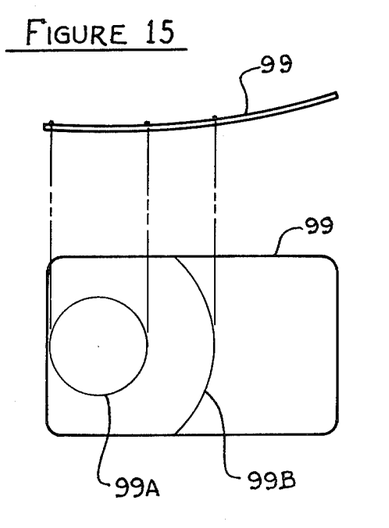
FIG. 15 shows an outside mirror having an additional concentric arc to aid distance perception and to locate observed objects.

FIG. 15 illustrates a side view mirror 99 having the preferred curvature with a pair of concentric rings 99A and 99B. The larger ring aids the user in judging distance and the relative position of trailing or passing vehicles.

Figure 7:
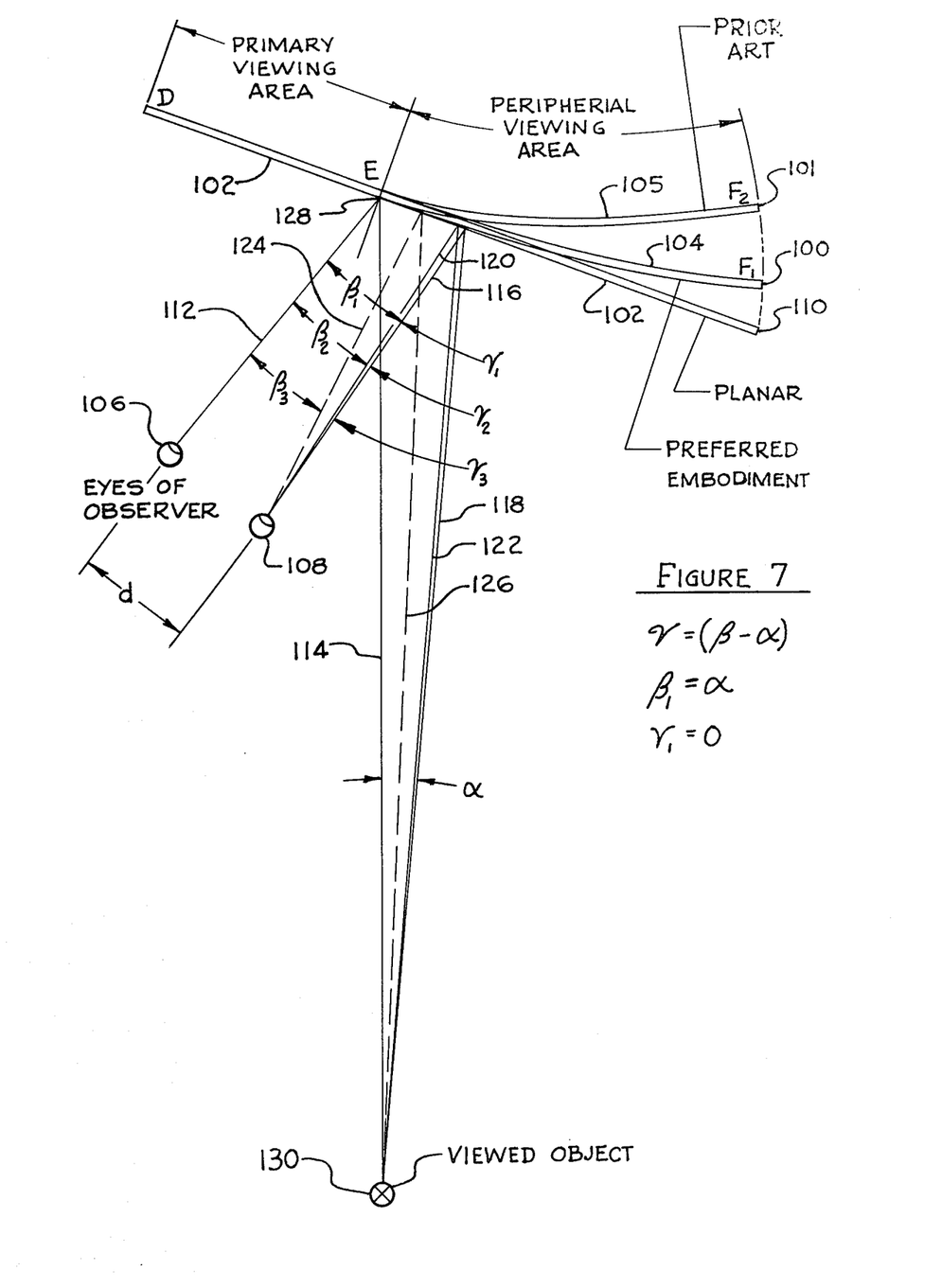
FIG. 7 compares the curvature of the preferred mirror to a flat plane mirror and to a prior art geometry.

FIG. 7 illustrates the problem of bi-ocular vision with respect to compound mirrors 100 and 101, having a primary viewing surface 102 which extends from point "D" to point "E" and then curved peripheral viewing areas 104 or 105 that extend from point "E" to point "$F_1$" and "$F_2$", respectively. The bi-ocular vision of the observer is the result of the user having two eyes 106 and 108 spaced a distance "d". The $\gamma$ angles illustrated are a measure of bi-ocular astigmatism. The relationship is: $\gamma=(\beta-\alpha)$. Note: These $\alpha,\beta$ and $\gamma$ symbols do not relate to FIG. 4. The greatest $\gamma$ value represents the greatest astigmatic problem, since it is the result of a proportionately smaller instantaneous radius of curvature which in turn produces a more reduced image size that cannot be comfortably compared to the larger image size observed by the left eye at the point "E". Assuming the cross sections of mirrors 100 and 101 are superimposed on the cross section of a planar mirror 110, if the user views an object through the planar mirror, the ling-of-sight 112 of his left eye will be reflected off the reflective surface of the mirror to a continuation of his line-of-sight 114. Since the compound mirrors 100 and 101 are constructed tangent to the planar mirror 110 at point 128, and all three have coincident surfaces between points "D" and "E", the viewer's line-of-sight 112 and 114 for his left eye 106 are identical. Three conditions are then illustrated for the lines-of-sight of the observer's right eye 108, as follows:

For the planar mirror 110 his line-of-sight 116 is reflected to a continuation of his line-of-sight 118 toward the viewed object 130. For the peripheral surface 104 of mirror 100 having a radius of curvature at the point of tangency 128 substantially equal to that of the primary viewing surface 102 and gradually reducing as the curvature proceeds from the point of tangency 128, his line-of-sight 120 is reflected to a continuation of his line-of-sight 122 converging upon viewed object 130. For the peripheral surface 105 of mirror 101, having a radius of curvature at the point of tangency 128 significantly smaller than that of the primary viewing surface 102, his line-of-sight 124 is reflected to a continuation of his line-of-sight 126 toward the object 130.

$\gamma_1$, $\gamma_2$, and $\gamma_3$, respectively, represent the three foregoing astigmatic factors for the three conditions just described for right eye 108. For planar mirror 110, no astigmatism exists since $\gamma_1$ equals zero. For mirror 101, $\gamma_3$ is very large and unacceptable, causing great eye discomfort and blurred images. For mirror 100, which agrees with the preferred embodiments and concept of this invention, $\gamma_2$ is small and controlled within acceptable limits of distortion. This condition is affected by two principal factors of this invention, namely causing the instantaneous radius of curvature of the primary and peripheral viewing surfaces to be substantially equal at their point of tangency 128 and by controlling the reducing radius of curvature of the peripheral viewing surface according to the mathematical relationships of Formulae (1) through (6).

Summarizing, if the viewer is looking at a compound mirror so that his left eye is looking at the primary viewing surface of the compound mirror, but the right eye is looking at the image through the peripheral viewing area, having a significantly reduced radius of curvature, the sudden change in the curvature of the peripheral viewing area from the primary area produces a reflected line-of-sight that produces an unacceptable astigmatic factor with a great difference in image size observed by the two eyes. On the other hand, by using the preferred mathematical relationships, the astigmatic factor (which is the angle $\gamma_2$ illustrated in FIG. 7) is relatively small.

The result is a gradual change in the image size observed by the observer's two eyes so that he can comfortably observe an image crossing the transition between the two curvatures of the mirror, and crossing the peripheral section itself.

In summary, it is to be understood that I have described a rearview mirror having a controlled image distortion as the observer views an object moving across the mirror such that his eyes can comfortably adjust as the image travels through the transition between the peripheral portion and the primary viewing surface of the mirror, and across the peripheral areas as well.

It is to be further understood that I have described a mirror having a relatively common height, but in which the mirror ends are formed so as to be lower than the midsection of the mirror in order to optimize the viewing area through the rearview window of a conventional vehicle, as well as to provide a line-of-sight through the side windows and thereby provide an effective and wide field of view about the sides and rear of the vehicle.

Having described my invention, I claim:

1. A mirror having a viewing surface with a curvature substantially in accordance with the following mathematical relationship, expressed in incremental field angular relationships:

$$\Delta\delta_n = \Delta\delta_{(n-1)}[1+X]$$

in which (n) defines the point of interest along a substantially horizontal line of the mirror's surface, beginning at the optical design axis at which point the line of sight of an observer located substantially in the normal operator's position with respect to the mirror is reflected straight rearward with respect to the vehicle's forward direction; or beginning at the interface with a primary viewing surface, wherein: (n−1) defines the point of interest immediately preceding (n); $\delta_n$ defines the accumulated field angle from the optical design axis of the mirror, or from the interface with a primary viewing surface, to the point of interest (n); $\Delta\delta_n$ defines the incremental field angle between (n) and (n−1); X is the constant factor generating a constant rate of horizontal optical distortion with respect to $\Delta\delta_{(n-1)}$, which is chosen to produce a desired total field of view across the variable-radius surface, all other factors remaining unchanged; and $\Delta\theta$ is the constant vision angle increment to which all $\Delta\delta_n$ values are related.

2. A mirror having a viewing surface, whose cross-section is generated according to the structural, geometrical and mathematical relationships as defined in claim 1, and which cross-section is revolved about an axis which is located (r) distance from a point on the mirror's surface, which point lies on a plane passing through the center of rotation, said plane being at right angles to any other plane which is tangent to the mirror's surface at its focal point.

3. A mirror having a viewing surface with a curvature substantially in accordance with the following mathematical relationship, expressed in incremental field angular relationships:

$$\Delta\delta_n = \Delta\delta_{(n-1)}[1+(n/N)(2X)]$$

in which (n) defines the point of interest along a substantially horizontal line of the mirror's surface, beginning at the optical design axis at which point the line of sight of an observer located substantially in the normal operator's position with respect to the mirror is reflected straight rearward with respect to the vehicle's forward direction; or, beginning at the interface with a primary viewing surface, wherein: (n−1) defines the point of interest immediately preceding (n); $\delta_n$ defines the accumulated field angle from the optical design axis of the mirror, or from the interface with a primary viewing surface, to the point of interest (n); $\Delta\delta_n$ defines the incremental field angle between (n) and (n−1); N represents total iterations across the variable-radius surface; X is the constant factor controlling horizontal optical distortion, which is chosen to produce a desired total field of view across the variable-radius surface, all other factors remaining unchanged; and the (n/N) ratio generates a constantly changing rate of change of $\Delta\delta_n$ with respect to $\Delta\delta_{(n-1)}$; and $\Delta\theta$ is the constant vision angle increment to which all $\Delta\delta_n$ values are related.

4. A mirror having a viewing surface with a curvature substantially in accordance with the following mathematical relationship, expressed in incremental field angular relationships:

$$\Delta\delta_n = \Delta\delta_{(n-1)}[1+h+(n/N)(2X-2h)]$$

in which (n) defines the point of interest along a substantially horizontal line of the mirror's surface, beginning at the optical design axis at which point the line of sight of an observer located substantially in the normal operator's position with respect to the mirror is reflected straight rearward with respect to the vehicle's forward direction; or, beginning at the interface with a primary viewing surface, wherein: (n−1) defines the point of interest immediately preceding (n); $\delta_n$ defines the accumulated field angle from the optical design axis of the mirror, or from the interface with a primary viewing surface, to the point of interest (n); $\Delta\delta_n$ defines the incremental field angle between (n) and (n−1); (N) represents total iterations across the variable-radius surface; (X) is the constant factor controlling horizontal optical distortion, which is chosen to produce a desired total field of view across the variable-radius surface, all other factors remaining unchanged; (h) is a value chosen between zero and (X) and becomes the initial value for the multiplying factor at the beginning of the variable-radius curve where (n=1) and is subtracted from (2X) at the final iteration point where (n=N), thus altering the rate of change characteristics of the constantly changing multiplying factor across the variable-radius surface as well as changing its magnitude at both the beginning and ending points of said variable-radius curve; the (n/N) ratio generates a constantly changing rate of change of $\Delta\delta_n$ with respect to $\Delta\delta_{(n-1)}$; and $\Delta\theta$ is the constant vision angle increment to which all $\Delta\delta_n$ values are related.

5. A mirror having a viewing surface with a final curvature revolved about a central axis of curvature to form a right mirror half and a left mirror half, said final curvature being developed by generating a first curve for the right mirror half and a second curve for the left mirror half and then generating said final curvature as an average of the first and second mirror halves, said first and second curvatures being generated in accordance with the structural, geometrical and mathematical relationships as defined in claim 1, wherein the averaging process is carried out by independently generating the right half and left half ($x_n$, $y_n$) curvature coordinate pairs, wherein the right and left ($x_n$) values are equal to each other, and then for each pair adding the respective ($y_n$) off-set components and dividing them by (2) to produce new ($y_n$) values for each respective ($x_n$) pair, thus completing the averaging process.

6. A mirror having a spherical primary viewing surface with a circular border, the diameter of which is considerably larger than the height of the mirror's central structure, and having right and left edge viewing surfaces with a curvature revolved about a central axis thus forming a right mirror segment and a left mirror segment, said curvature being developed by generating a first curve for the right mirror segment and a second curve for the left mirror segment, each segment of curvature being rotated 180 degrees about the common central axis and tangentially joining the spherical primary surface, said curvature being generated in accordance with the structural, geometrical and mathematical relationships as defined in claims 1.

7. A mirror having a viewing surface with a curvature developed about a central axis having a predetermined angle with respect to a predetermined line of sight of an observer and generated along a plurality of radial lines radiating from the intersection of said lines with said central axis and extending 360 degrees about said axis, the curve developed along each of said radial lines being in accordance with the structural, geometrical and mathematical relationships defined in claim 1.

8. A mirror as defined in claims 1, 3, 4, 5, 6 or 7, in which the mirror has a primary viewing surface, said primary viewing surface having a border merging substantially tangentially into said first-mentioned viewing surface.

9. A mirror as defined in claim 8, in which the primary viewing surface is flat.

10. A mirror as defined in claim 8, in which the primary viewing surface is curved.

11. A mirror as defined in claim 8, in which the primary viewing surface is spherical.

12. A mirror as defined in claim 8, in which the primary viewing surface is generated by a non-distorting geometry.

13. A mirror as defined in claim 8, in which the primary viewing surface has an instantaneous radius of curvature at said border, and said first-mentioned viewing surface has an instantaneous radius of curvature at said border substantially equal to the instantaneous radius of curvature of the primary viewing surface at their points of tangency; so that the instantaneous slope angles of said surfaces, with respect to common reference axis (x—x), are equal to each other at said point of tangency.

14. A mirror as defined in claim 8, in which the viewing surface of the mirror forms a segment of a surface of revolution developed by revolving said curvature about an axis.

15. A mirror as defined in claim 8, in which the viewing surface of the mirror forms an elongated structure.

16. An inside mounted rearview mirror for an automotive vehicle, as defined in claim 8, said mirror having a reflective surface being elongated and having opposite end sections curved downward in a common direction parallel to a plane which is normal to the focal axis of the mirror.

17. A mirror as defined in claim 8, in which the first-mentioned viewing surface forms a segment of a surface of revolution developed by revolving said curvature about an axis normal to said primary viewing surface and extending through the center thereof.

18. A mirror as defined in claim 8, in which the mirror is formed by extending the curvature along a linear axis such that the curvature defines the cross section of said mirror.

19. A mirror as defined in claim 14, in which the axis of revolution is spaced from the mirror.

20. A mirror as defined in claim 14, in which the axis of revolution extends through the edge of the viewing surface.

21. A mirror as defined in claim 14, in which the axis extends through the mirror.

22. A mirror as defined in claim 8, in which the mirror is formed of an anti-glare glass means.

23. A mirror as defined in claim 8, in which the mirror has the shape of a prismatic wedge producing maximum light reflection from a silvered second surface and minimum light reflection from an untreated first surface.

24. A mirror as defined in claim 14, and having a silvered surface, upon which a narrow but visible bull's eye ring is permanently affixed to the silvered surface of the mirror, being located such as to essentially define the boundary between the primary viewing surface and edge viewing surface; and to which one or more additional concentric ring(s) may also be affixed, being concentric with said first mentioned ring.

25. A mirror as defined in claim 8, constructed of a transparent plastic material.

26. A mirror having a viewing surface with a final curvature revolved about a central axis of curvature to form a right mirror half and a left mirror half, said final curvature being developed by generating a first curve for the right mirror half and a second curve for the left mirror half and then generating said final curvature as an average of the first and second mirror halves, said first and second curvatures being generated in accordance with the structural, geometrical and mathematical relationships as defined in claim 3, wherein the averaging process is carried out by independently generating the right half and left half ($x_n$, $y_n$) curvature coordinate pairs, wherein the right and left ($x_n$) values are equal to each other, and then for each pair adding the respective right and left ($y_n$) off-set components and dividing them by (2) to produce new ($y_n$) values for each respective ($x_n$) pair, thus completing the averaging process.

27. A mirror having a viewing surface with a final curvature revolved about a central axis of curvature to form a right mirror half and left mirror half, said final curvature being developed by generating a first curve for the right mirror half and a second curve for the left mirror half and then generating said final curvature as an average of the first and second mirror halves, said first and second curvatures being generated in accordance with the structural, geometrical and mathematical relationships as defined in claim 4, wherein the averaging process is carried out by independently generating the right half and left half ($x_n$, $y_n$) curvature coordinate pairs, wherein the right and left ($x_n$) values are equal to each other, and then for each pair adding the respective right and left ($y_n$) off-set components and dividing them by (2) to produce new ($y_n$) values for each respective ($x_n$) pair, thus completing the averaging process.

28. A mirror having a spherical primary viewing surface with a circular border, the diameter of which is considerably larger than the height of the mirror's central structure, and having right and left edge viewing surfaces with a curvature revolved about a central axis thus forming a right mirror segment and a left mirror segment, said curvature being developed by generating a first curve for the right mirror segment and a second curve for the left mirror segment, each segment of curvature being rotated 180 degrees about the common central axis and tangentially joining the spherical primary surface, said curvature being generated in accordance with the structural, geometrical and mathematical relationships as defined in claim 3.

29. A mirror having a spherical primary viewing surface with a circular border, the diameter of which is considerably larger than the height of the mirror's central structure, and having right and left edge viewing surfaces with a curvature revolved about a central axis thus forming a right mirror segment and a left mirror segment, said curvature being developed by generating a first curve for the right mirror segment and a second curve for the left mirror segment, each segment of curvature being rotated 180 degrees about the common central axis and tangentially joining the spherical primary surface, said curvature being generated in accordance with the structural, geometrical and mathematical relationships as defined in claim 4.

30. A mirror having a viewing surface with a curvature developed about a central axis having a predetermined angle with respect to a predetermined line of sight of an observer and generated along a plurality of radial lines radiating from the intersection of said lines with said central axis and extending 360° about said axis, the curve developed along each of said radial lines being in accordance with the structural, geometrical and mathematical relationships defined in claim 3.

31. A mirror having a viewing surface with a curvature developed about a central axis having a predetermined angle with respect to a predetermined line of sight of an observer and generated along a plurality of radial lines radiating from the intersection of said lines with said central axis and extending 360° about said axis, the curve developed along each of said radial lines being in accordance with the structural, geometrical and mathematical relationships defined in claim 4.

32. A mirror having a viewing surface, whose cross-section is generated according to the structural, geometrical and mathematical relationships as defined in claim 3, and which cross-section is revolved about an axis which is located (r) distance from a point on the mirror's surface, which point lies on a plane passing through the center of rotation, said plane being at right angles to any other plane which is tangent to the mirror's surface at its focal point.

33. A mirror having a viewing surface, whose cross-section is generated according to the structural, geometrical and mathematical relationships as defined in claim 4, and which cross-section is revolved about an axis which is located (r) distance from a point on the mirror's surface, which point lies on a plane passing through the center of rotation, said plane being at right angles to any other plane which is tangent to the mirror's surface at its focal point.

* * * * *